United States Patent [19]
Mendler et al.

[11] Patent Number: 5,927,394
[45] Date of Patent: Jul. 27, 1999

[54] STACKING DISK OIL COOLER AND METHOD OF MAKING SAME

[75] Inventors: Robert Mendler, Korntal-Münchingen; Gerd Schleier, Schwaikheim; Gebhard Schwarz, Stuttgart, all of Germany

[73] Assignee: Behr GmbH & Co., Stuttgart, Germany

[21] Appl. No.: 09/042,560

[22] Filed: Mar. 17, 1998

[30] Foreign Application Priority Data

Mar. 18, 1997 [DE] Germany .......................... 197 11 258

[51] Int. Cl.⁶ .......................................................... F28F 3/08
[52] U.S. Cl. ........................ 165/166; 165/167; 165/906; 165/916
[58] Field of Search .................... 165/167, 916, 165/906, 166

[56] References Cited

U.S. PATENT DOCUMENTS

| | | | |
|---|---|---|---|
| 4,708,199 | 11/1987 | Yogo et al. | 165/167 |
| 4,892,136 | 1/1990 | Ichihara et al. | 165/916 X |
| 4,987,955 | 1/1991 | Bergqvist et al. | 165/167 |
| 5,099,912 | 3/1992 | Tajima et al. | 165/916 X |
| 5,462,113 | 10/1995 | Wand | 165/167 |
| 5,464,056 | 11/1995 | Tajima et al. | 165/167 |
| 5,511,612 | 4/1996 | Tajima et al. | 165/167 |
| 5,810,071 | 9/1998 | Pavlin | 165/916 X |

FOREIGN PATENT DOCUMENTS

| | | | |
|---|---|---|---|
| 0 623 798 | 11/1994 | European Pat. Off. | 165/167 |
| 693 00 478 | 5/1996 | Germany . | |
| 195 19 740 | 12/1996 | Germany . | |
| 89991 | 3/1990 | Japan | 165/906 |
| 204596 | 9/1991 | Japan | 165/906 |
| 271697 | 12/1991 | Japan | 165/167 |

*Primary Examiner*—Leonard Leo
*Attorney, Agent, or Firm*—Evenson, McKeown, Edwards & Lenahan, PLLC

[57] ABSTRACT

Known constructions of oil coolers for motor vehicles are generally fastened directly by means of the base plate on the engine block and are therefore subjected to extremely high lateral acceleration forces during the operation of the engine. Stacking disk oil coolers, as a rule, do not withstand such forces because the lowest disk may deform during the operation so that the effectiveness of the cooler becomes questionable. It is suggested to arrange a reinforcing plate between the lowest plate of the stacking disk oil cooler and a base plate, which reinforcing plate is provided with a rim surrounding the edge of the lowest plate. This measure increases the stability of the stacking disk oil cooler so that it can be fastened directly to the engine block.

5 Claims, 2 Drawing Sheets

STACKING DISK OIL COOLER AND METHOD OF MAKING SAME

This application claims the priority of foreign application No. 197 11 258.7 filed in Germany on Mar. 18, 1997, the disclosure of which is expressly incorporated by reference herein.

BACKGROUND AND SUMMARY OF THE INVENTION

The invention relates to a stacking disk oil cooler for a motor vehicle engine, comprising several trough-shaped plates which, with their upright edges situated inside one another, are stacked in a spaced manner and are soldered together for forming adjacent hollow chambers, the lowest plate being mounted on a base plate.

Stacking disk oil coolers of this type are known from European Patent Document EP 0 623 798 A2. In the case of constructions of this type, the lowest of the trough-shaped plates, which is mounted on the base plate, forms the weakest link with respect to the stability. Oil coolers are generally fastened directly by means of the base plate on the engine block and, during the operation of the engine, are therefore subjected to extremely high lateral acceleration forces. As a rule, stacking disk oil coolers of the above-mentioned type do not withstand such forces. During the operation, the lowest disk may deform so that the effect of the cooler becomes doubtful.

It is an object of the present invention to further develop a stacking disk oil cooler of the initially mentioned type such that it corresponds to the stability requirements also when it is mounted directly on the engine block so that it will not be necessary to use other cooler constructions for these types of mountings.

For achieving this object, it is provided according to the invention in the case of a stacking disk oil cooler of the initially mentioned type that a reinforcing disk is arranged between the base plate and the lowest plate, which reinforcing disk is provided with a rim surrounding the edge of the lowest plate. By means of this arrangement, the thin edge of the lowest plate, which when installed directly on the engine block is subjected to the risk of buckling, is reinforced so that in a relatively simple manner stacking disk oil coolers are also suitable for a direct mounting on the engine block. Because of their higher stability, oil coolers according to the invention can also be used for different purposes if higher stability is important, according to other contemplated embodiments.

As a further development of certain preferred embodiments of the invention, the rim has the shape of upright tabs which rest only against the longitudinal and transverse sides of the edge of the rectangular plate. This permits a very simple development of the reinforcing disk which, however, nevertheless results in the desired reinforcing effect. In a further development of certain preferred embodiments of the invention, the tabs may project from the reinforcing plate at an angle which is adapted to the angle of slope of the edges of the plate, and are correspondingly bent for this purpose. In this case, it is not necessary that a contact takes place in the bending area with the edge bend of the lowest plate. It is sufficient for the tabs to rest against the longitudinal and transverse sides of the upright edge of the lowest plate so that, as a result, they project into an area in which, because of its construction, the stacking disk oil cooler already has a higher stability. An adaptation of the tabs of the reinforcing disk also in the bending area, which is more difficult to implement, is usually unnecessary but, if the use is extreme, can also be implemented.

Other objects, advantages and novel features of the present invention will become apparent from the following detailed description of the invention when considered in conjunction with the accompanying drawings.

DETAILED DESCRIPTION OF THE DRAWINGS

Figure 1:
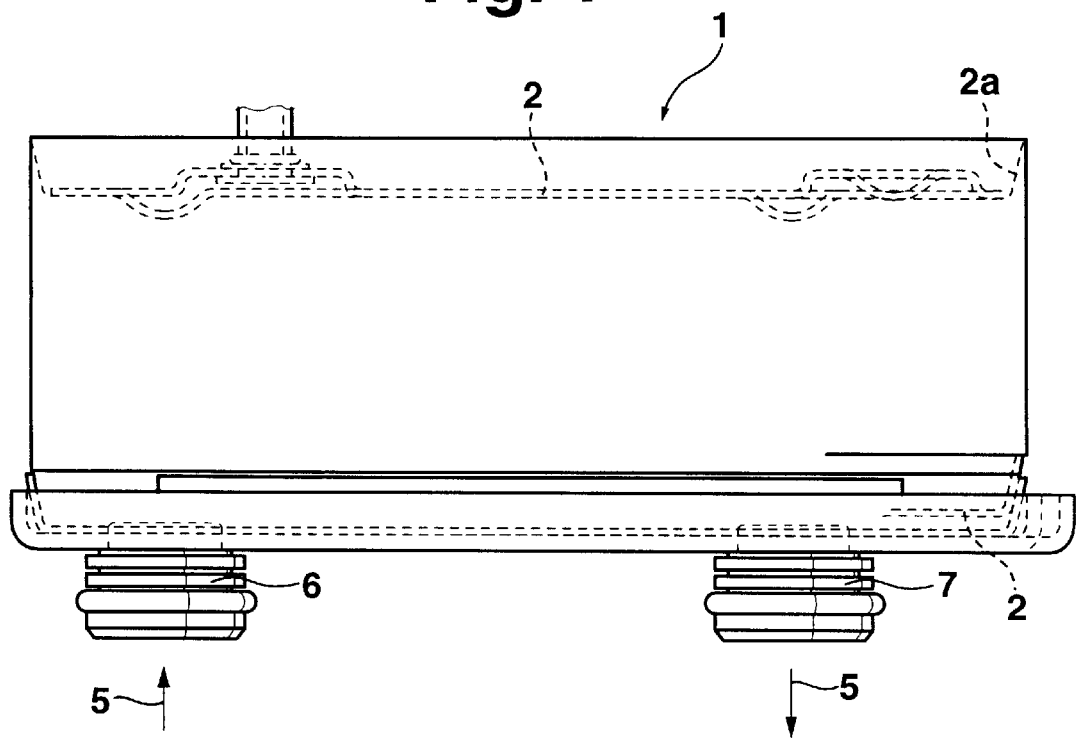
FIG. 1 is a schematic lateral view of a stacking disk oil cooler constructed according to a preferred embodiment of the invention.
Figure 2:
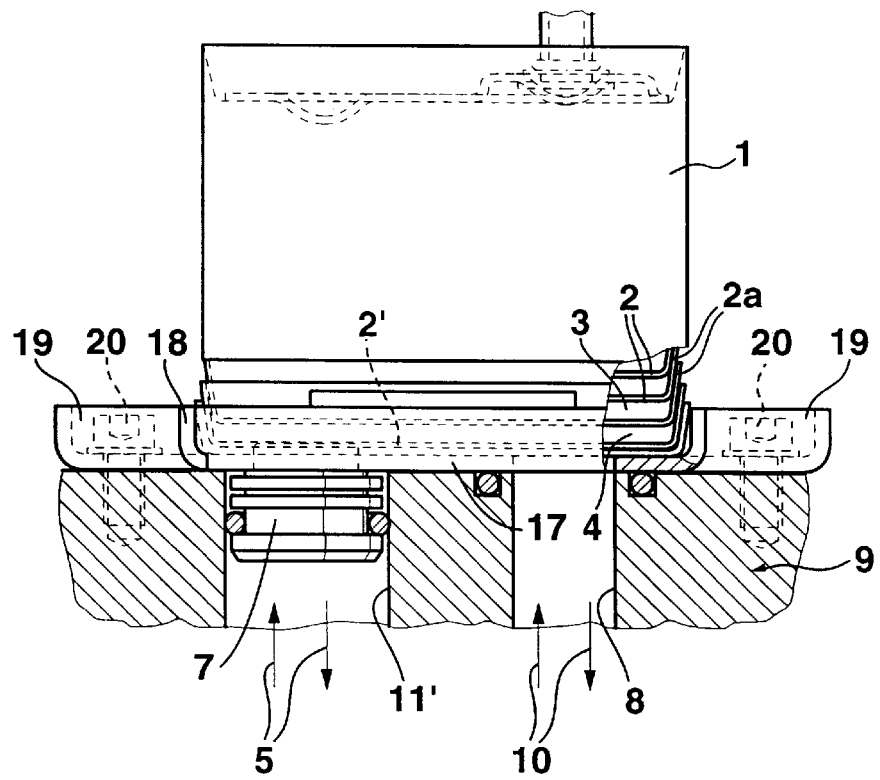
FIG. 2 is a frontal view of the stacking disk oil cooler according to FIG. 1.
Figure 5:
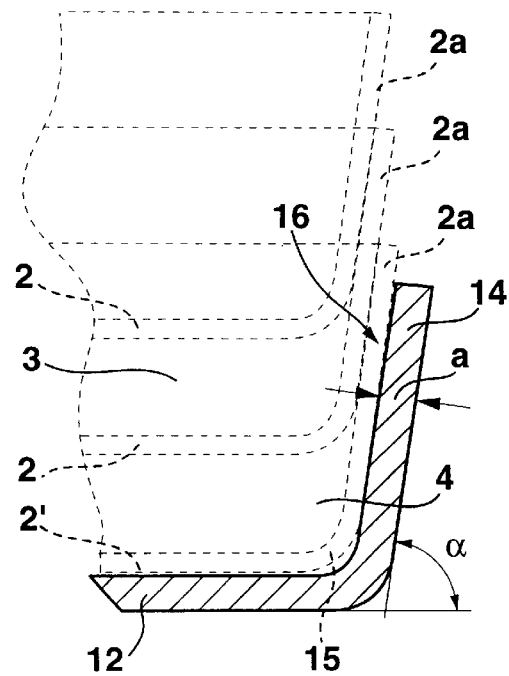
FIG. 5 is an enlarged detail of the section V—V in FIG. 3, the interaction between the reinforcing disk and the stacking disk oil cooler being outlined.

FIGS. 1 and 2 show a housing block 1 of a stacking disk oil cooler according to the invention which is constructed of trough-shaped plates 2 which are stacked at a distance above one another and whose edges 2a mutually overlap and are soldered to the wall of the oil cooler block 1 (in this regard, also see FIG. 5). Between two adjacent plates 2 respectively, hollow chambers 3, 4 are formed in this manner through which the media, which take part in the heat transmission, flow in an alternating fashion. Thus, corresponding to the arrows 5, the engine oil to be cooled enters the stacking disk oil cooler through an inlet connection piece 6 and leaves this oil cooler through an outlet connection piece 7.

The coolant of the engine, which engine is not shown, enters by way of a bore 8 in the engine block 9 in the direction of the arrows 10 into the stacking disk oil cooler and leaves it again, also in the direction of the return arrow 10, in which case, as also in the case of the feeding and removing of oil, a return bore is also provided which is arranged at a distance from the bore 8. The oil also arrives at the feeding connection piece 6 by way of a feeding bore, which is not shown in detail, in the engine block 9, and it leaves the cooler block 1 through a bore 11' arranged in parallel thereto into which the discharge connection piece 7 projects. In a manner not shown in detail, in order to achieve the desired heat transition between the coolant and the oil, oil or coolant flows through respective adjacent hollow chambers 3, 4, and, in a known manner, all chambers through which one of the media flows are sealed off with respect to the inflow of the other medium.

The lowest of the trough-shaped plates—plate 2'—according to the illustrated embodiment of the invention, is surrounded by a reinforcing disk 12 which, by means of its flat center part 12b, is soldered to the lowest plate 2'. As particularly illustrated in FIGS. 3 and 4, this reinforcing plate has upright tabs 13, 14 on its longitudinal and transverse sides which tabs are bent upwards at an angle α from the plane bottom area, which angle α is adapted to the angle of slope at which the edges 2a of the plates 2 are bent to the outside. FIG. 5 shows that the tabs—analogously also the tabs 13—in the area of the bend 15 of the edges 2a of the lowest plate 2' do not rest against this plate but rest against it only in the straight area of those edges 2a and particularly also in the area 16 in which an overlapping of at least two edges 2a and thus also a higher stability already exists.

The reinforcing disk 12 is made of a material—particularly of aluminum—which may correspond to that of plates 2. However, the material thickness for the reinforcing plate 12 is selected to be substantially larger than the thickness of the plates 2. The thickness of reinforcing plate 12 is more than 1.5 times as thick as plate 2', and preferably between 1.5 and three times as thick as plate 2'.

Figure 3:
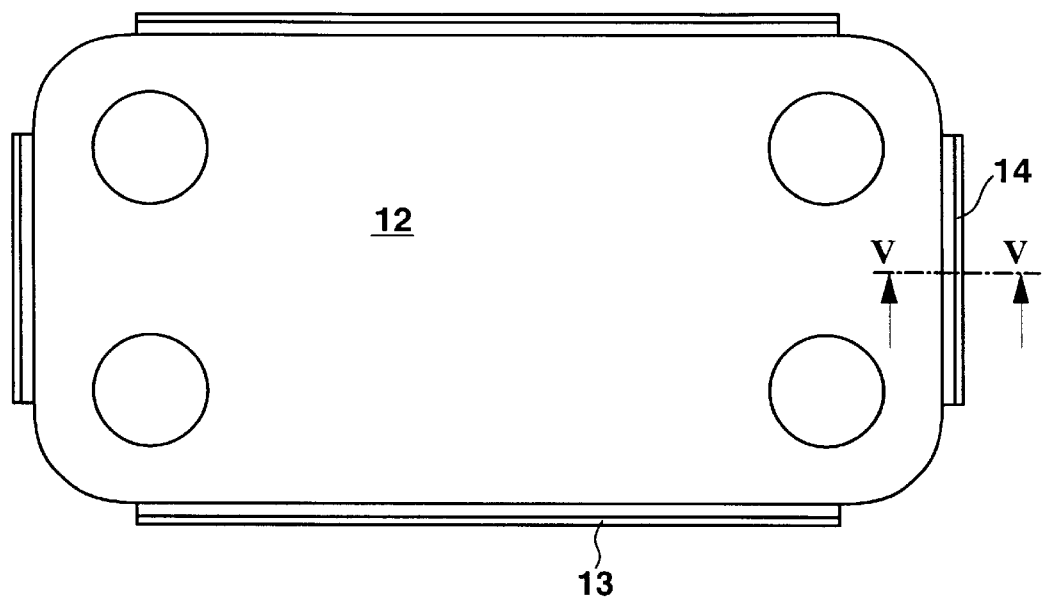
FIG. 3 is a top view of the reinforcing disk (without stacking disk oil cooler) used for the stacking disk oil cooler of FIGS. 1 and 2.
Figure 4:
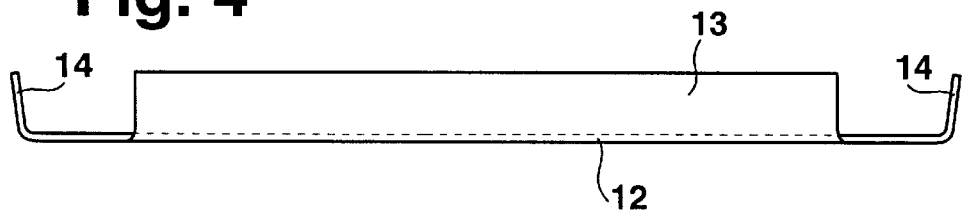
FIG. 4 is a lateral view of the reinforcing disk of FIG. 3.

FIGS. 3 and 4 also show that the bent-up tabs 13, 14 are provided only on the straight sides of the reinforcing plate 12 and that, in contrast, no tabs are provided in the curved deflection area from the longitudinal sides to the transverse sides.

FIGS. 1 and 2 illustrate that the cooler block 1, which is closed off in this manner on one side by the reinforcing plate 12, is placed on a base plate 17 which has a surrounding edge 18 for holding the cooler block 1 and at least two laterally projecting tab areas 19 are provided in which fastening screws 20 exist for the fastening on the engine block 9. The reinforcing plate 12 can be soldered to the plate 2' adjoining it as wall as to the base plate 17. The surrounding edge 18 forms a receiving device into which the surrounding edge 18 forms a receiving device into which the end of the cooler block 1 with the reinforcing plate 12 and its upwardly bent tabs 13 and 14 is fitted. Because of the stable fastening of the cooler block 1 on the engine block 9, vibrations or movements occurring at the engine during the operation of the vehicle cannot damage the engine block 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Stacking disk oil cooler for a motor vehicle engine, comprising:

several trough-shaped plates which, with their upright edges situated inside one another, are stacked in a spaced manner and are soldered together for forming adjacent hollow chambers, a base plate on which a lowest plate of said several trough-shaped plates is mounted, and a reinforcing plate arranged between the base plate and the lowest plate and provided with a rim surrounding edges of the lowest plate, wherein the rim is formed by upright tabs which rest only against longitudinal and transverse sides of the lowest plate, and wherein each of the tabs is bent with a bending area out of contact with an assigned facing bend of one of the edges of the lowest plate.

2. Stacking disk oil cooler according to claim 1, wherein the tabs project from the reinforcing plate at an angle ($\alpha$) adapted to an angle at which edges of the reinforcing plate slope.

3. Stacking disk oil cooler according to claim 1, wherein the reinforcing plate has a thickness which is larger than the thickness of each of the trough-shaped plates.

4. Stacking disk oil cooler for a motor vehicle engine, comprising:

several trough-shaped plates which, with their upright edges situated inside one another, are stacked in a spaced manner and are soldered together for forming adjacent hollow chambers, a base plate on which a lowest plate of said several trough-shaped plates is mounted, and a reinforcing plate arranged between the base plate and the lowest plate and provided with a rim surrounding edges of the lowest plate, wherein the rim is bent with a bending area out of contact with an assigned facing bend of the edges of the lowest plate.

5. Stacking disk oil cooler according to claim 4, wherein the reinforcing plate has a thickness which is larger than the thickness of each of the trough-shaped plates.

* * * * *